United States Patent
Bi et al.

(10) Patent No.: US 6,563,663 B1
(45) Date of Patent: May 13, 2003

(54) REPEATABLE RUNOUT COMPENSATION USING ITERATIVE LEARNING CONTROL IN A DISC STORAGE SYSTEM

(75) Inventors: Qiang Bi, Singapore (SG); Kevin A. Gomez, Singapore (SG); YangQuan Chen, Singapore (SG); KianKeong Ooi, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/474,277

(22) Filed: Dec. 29, 1999

Related U.S. Application Data

(60) Provisional application No. 60/132,992, filed on May 7, 1999.

(51) Int. Cl.[7] .............................................. G11B 5/596
(52) U.S. Cl. ................................................... 360/77.04
(58) Field of Search ........................... 360/77.04, 78.04, 360/78.09

(56) References Cited

U.S. PATENT DOCUMENTS

| | | | |
|---|---|---|---|
| 3,725,764 A | 4/1973 | Oswald ........................ 318/629 |
| 3,863,124 A | 1/1975 | Pierce et al. ................. 318/638 |
| 3,914,541 A | 10/1975 | Elliott .......................... 178/6.6 |
| 4,030,132 A | 6/1977 | Iftikar et al. ................... 360/78 |
| 4,103,314 A | 7/1978 | Case ............................. 360/78 |
| 4,135,217 A | 1/1979 | Jacques et al. ................ 360/77 |
| 4,149,199 A | 4/1979 | Chick et al. ................... 360/77 |
| 4,217,612 A | 8/1980 | Matla et al. ................... 360/78 |
| 4,314,295 A | 2/1982 | Frandsen .................... 360/106 |
| 4,329,712 A | 5/1982 | Lang ........................ 358/128.5 |
| 4,355,266 A | 10/1982 | Pearson ........................ 318/85 |
| 4,371,960 A | 2/1983 | Kroiss ........................... 369/43 |
| 4,396,961 A | 8/1983 | Prasad et al. .................. 360/78 |
| 4,414,589 A | 11/1983 | Oliver et al. .................. 360/77 |
| 4,456,934 A | 6/1984 | Wedman et al. ............... 360/78 |
| 4,485,418 A | 11/1984 | Bremmer ...................... 360/77 |
| 4,497,047 A | 1/1985 | Fujiie et al. ................... 369/45 |
| 4,513,333 A | 4/1985 | Young et al. .................. 360/77 |
| 4,524,397 A | 6/1985 | Bond ............................ 360/75 |

(List continued on next page.)

FOREIGN PATENT DOCUMENTS

| | | |
|---|---|---|
| DE | 3900683 A | 1/1989 |
| DE | 197 15 678 A1 | 10/1997 |
| EP | 0 130 248 A1 | 1/1985 |
| EP | 0 540 114 A1 | 5/1993 |
| EP | 0 549 814 A1 | 7/1993 |
| GB | 2 060 217 A | 4/1981 |
| GB | 1713268 | 3/1991 |
| WO | WO 91/06096 | 5/1991 |
| WO | WO 93/06595 | 4/1993 |
| WO | WO 97/45833 | 12/1997 |

OTHER PUBLICATIONS

*Recording Properties of Multilayered Thin Film Media*, by D.C. Palmer, K.E. Johnson, E.Y. Wu, and J.V. Peske, IEEE Transactions On Magnetics, vol. 27, No. 6, Nov. 1991, pp. 5307–5309.

(List continued on next page.)

*Primary Examiner*—David Hudspeth
*Assistant Examiner*—Mitchell Slavitt
(74) *Attorney, Agent, or Firm*—Westman, Champlin & Kelly, P.A.

(57) ABSTRACT

A disc storage system is provided which includes a servo control loop for compensating for repeatable runout. Repeatable runout is compensated using table entries of the form Comp Value(k+1)=Comp Value(k)+K$\Phi$(z)RRO(k), where K is a learning rate; k is iteration number $\Phi$(z) is a filter and RRO(k) is the repeatable runout error. Further, $\rho(j\omega)=|1-K\Phi(j\omega)/(1+PC(j\omega)|<1$ needs to be satisfied, where PC(j$\omega$) is an open loop frequency response of the servo loop. The filter can comprise a order filter.

18 Claims, 3 Drawing Sheets

U.S. PATENT DOCUMENTS

| | | | |
|---|---|---|---|
| 4,562,494 A | 12/1985 | Bond | 360/75 |
| 4,575,776 A | 3/1986 | Stephens et al. | 360/78 |
| 4,605,977 A | 8/1986 | Matthews | 360/103 |
| 4,616,276 A | 10/1986 | Workman | 360/77 |
| 4,620,244 A | 10/1986 | Krause | 360/77 |
| 4,620,252 A | 10/1986 | Bauck et al. | 360/106 |
| 4,633,345 A | 12/1986 | Keener | 360/77 |
| 4,636,885 A | 1/1987 | Yamada et al. | 360/78 |
| 4,677,602 A | 6/1987 | Okano et al. | 369/32 |
| 4,679,103 A | 7/1987 | Workman | 360/77 |
| 4,697,127 A | 9/1987 | Stich et al. | 318/561 |
| 4,697,213 A | 9/1987 | Kitamura | 360/78 |
| 4,706,250 A | 11/1987 | Patel | 371/39 |
| 4,727,533 A | 2/1988 | Erbert | 369/112 |
| 4,764,860 A | 8/1988 | Takao | 369/43 |
| 4,786,990 A | 11/1988 | Overton et al. | 360/65 |
| 4,788,608 A | 11/1988 | Tsujisawa | 360/77 |
| 4,791,599 A | 12/1988 | Hethuin et al. | 364/728.07 |
| 4,803,572 A | 2/1989 | Haruna et al. | 360/60 |
| 4,816,938 A | 3/1989 | Cowen et al. | 360/75 |
| 4,822,139 A | 4/1989 | Yshizumi | 350/257 |
| 4,878,135 A | 10/1989 | Makino et al. | 360/78.04 |
| 4,890,172 A | 12/1989 | Watt et al. | 360/77.04 |
| 4,897,840 A | 1/1990 | Weiss et al. | 371/40.1 |
| 4,924,165 A | 5/1990 | Kohno | 318/592 |
| 4,947,272 A | 8/1990 | Yokozawa | 360/77 |
| 4,956,831 A | 9/1990 | Sarraf et al. | 369/32 |
| 4,965,782 A | 10/1990 | Mathews | 369/48 |
| 5,046,060 A | 9/1991 | Chow et al. | 369/44.32 |
| 5,055,731 A | 10/1991 | Nihei et al. | 310/309 |
| 5,056,074 A | 10/1991 | Tateishi et al. | 369/44.28 |
| 5,062,023 A | 10/1991 | Squire | 360/78.04 |
| 5,073,885 A | 12/1991 | Ito et al. | 369/44.28 |
| 5,081,552 A | 1/1992 | Glaser et al. | 360/98.01 |
| 5,089,757 A | 2/1992 | Wilson | 318/560 |
| 5,122,718 A | 6/1992 | Sawata | 318/621 |
| 5,146,372 A | 9/1992 | Cronch et al. | 360/51 |
| 5,155,422 A | 10/1992 | Sidman et al. | 318/560 |
| 5,161,077 A | 11/1992 | Jabbari | 360/106 |
| 5,164,863 A | 11/1992 | Janz | 360/57 |
| 5,185,681 A | 2/1993 | Volz et al. | 360/77.05 |
| 5,187,620 A | 2/1993 | Notake et al. | 360/77.04 |
| 5,189,578 A | 2/1993 | Mori et al. | 360/106 |
| 5,197,058 A | 3/1993 | Bell, Jr. et al. | 369/44.28 |
| 5,198,948 A | 3/1993 | Stover et al. | 360/124 |
| 5,204,793 A | 4/1993 | Plonczak | 360/97.01 |
| 5,216,559 A | 6/1993 | Springer | 360/106 |
| 5,233,487 A | 8/1993 | Christensen et al. | 360/77.04 |
| 5,241,433 A | 8/1993 | Anderson et al. | 360/77.04 |
| 5,247,501 A | 9/1993 | Hashimoto et al. | 369/44.11 |
| 5,257,149 A | 10/1993 | Meyer | 360/78.14 |
| 5,270,885 A | 12/1993 | Satoh et al. | 360/77.04 |
| 5,274,511 A | 12/1993 | Ikeda | 360/55 |
| 5,287,225 A | 2/1994 | Jorgenson | 360/106 |
| 5,287,234 A | 2/1994 | Suzuki | 360/78.04 |
| 5,299,026 A | 3/1994 | Vincett et al. | 358/401 |
| 5,303,105 A | 4/1994 | Jorgenson | 360/106 |
| 5,305,160 A | 4/1994 | Funches et al. | 360/78.07 |
| 5,311,378 A | 5/1994 | Williams et al. | 360/77.03 |
| 5,367,513 A | 11/1994 | Bates et al. | 369/44.29 |
| 5,379,171 A | 1/1995 | Morehouse et al. | 360/10.5 |
| 5,400,201 A | 3/1995 | Pederson | 360/135 |
| 5,404,253 A | 4/1995 | Painter | 360/77.04 |
| 5,416,658 A | 5/1995 | Sega et al. | 360/106 |
| 5,444,582 A | 8/1995 | Suzuki | 360/78.09 |
| 5,444,583 A | 8/1995 | Ehrlich et al. | 360/78.09 |
| 5,455,724 A | 10/1995 | Suzuki et al. | 360/77.04 |
| 5,465,182 A | 11/1995 | Ishikawa | 360/75 |
| 5,465,183 A | 11/1995 | Hattori | 360/78.9 |
| 5,521,773 A | 5/1996 | Suzuki et al. | 360/77.04 |
| 5,521,778 A | 5/1996 | Boutaghou et al. | 360/106 |
| 5,523,902 A | 6/1996 | Pederson | 360/77.8 |
| 5,535,072 A | 7/1996 | Witt et al. | 360/99.06 |
| 5,539,714 A | 7/1996 | Andres, Jr. et al. | 369/44.26 |
| 5,541,784 A | 7/1996 | Cribbs et al. | 360/75 |
| 5,550,685 A | 8/1996 | Drouin | 360/77.08 |
| 5,553,086 A | 9/1996 | Sompel et al. | 371/47.1 |
| 5,576,909 A | 11/1996 | Dierkes et al. | 360/78.09 |
| 5,585,976 A | 12/1996 | Pham | 360/77.04 |
| 5,602,689 A | 2/1997 | Kadlec et al. | 360/78.04 |
| 5,608,586 A | 3/1997 | Sri-Jayantha et al. | 360/77.04 |
| 5,610,487 A | 3/1997 | Hutsell | 318/560 |
| 5,610,777 A | 3/1997 | Dang et al. | 360/77.03 |
| 5,638,230 A | 6/1997 | Kadlec | 360/78.04 |
| 5,646,797 A | 7/1997 | Kadlec et al. | 360/75 |
| 5,648,738 A | 7/1997 | Welland et al. | 327/307 |
| 5,675,450 A | 10/1997 | Kadlec | 360/78.09 |
| 5,677,809 A | 10/1997 | Kadlec | 360/78.09 |
| 5,680,272 A | 10/1997 | Kadlec et al. | 360/78.04 |
| 5,684,650 A | 11/1997 | Kadlec et al. | 360/77.06 |
| 5,706,265 A | 1/1998 | Bang | 369/50 |
| 5,708,581 A | 1/1998 | Martinez | 364/164 |
| 5,754,354 A | 5/1998 | Tomita et al. | 360/61 |
| 5,774,294 A | 6/1998 | Fioravanti | 360/75 |
| 5,774,297 A | 6/1998 | Hampshire et al. | 360/77.04 |
| 5,777,816 A | 7/1998 | Hampshire et al. | 360/77.08 |
| 5,793,559 A | 8/1998 | Shepherd et al. | 360/78.09 |
| 5,796,535 A | 8/1998 | Tuttle et al. | 360/51 |
| 5,796,542 A | 8/1998 | Szeremeta | 360/77.02 |
| 5,815,332 A | 9/1998 | Suzuki et al. | 360/48 |
| 5,822,147 A | 10/1998 | Kisaka | 360/77.08 |
| 5,825,578 A | 10/1998 | Shrinkle et al. | 360/77.08 |
| 5,826,338 A | 10/1998 | Chilton et al. | 30/90.1 |
| 5,828,515 A | 10/1998 | Kim | 360/78.06 |
| 5,835,300 A | 11/1998 | Murphy et al. | 360/77.05 |
| 5,835,302 A | 11/1998 | Funches et al. | 360/78.07 |
| 5,844,743 A | 12/1998 | Funches | 360/78.04 |
| 5,854,722 A | 12/1998 | Cunningham et al. | 360/77.04 |
| 5,883,749 A | 3/1999 | Park | 360/75 |
| 5,886,846 A | 3/1999 | Pham et al. | 360/78.04 |
| 5,898,286 A | 4/1999 | Clare et al. | 318/569 |
| 5,926,338 A | 7/1999 | Jeon et al. | 360/77.04 |
| 5,940,239 A | 8/1999 | Lee et al. | 360/77.02 |
| 5,940,240 A | 8/1999 | Kupferman | 360/77.08 |
| 5,949,605 A | 9/1999 | Lee et al. | 360/77.04 |
| 5,949,608 A | 9/1999 | Hunter | 360/78.09 |
| 5,956,201 A | 9/1999 | Pham et al. | 360/78.09 |
| 5,969,494 A | 10/1999 | Kang | 318/610 |
| 5,978,169 A | 11/1999 | Woods | 360/77.04 |
| 6,069,764 A * | 5/2000 | Morris et al. | 360/77.04 |
| 6,097,565 A | 8/2000 | Sri-Jayantha et al. | 360/78.09 |
| 6,115,203 A | 9/2000 | Ho et al. | 360/77.04 |
| 6,141,175 A | 10/2000 | Nazarian et al. | 360/77.04 |
| 6,310,742 B1 | 10/2001 | Nazarian et al. | 360/77.04 |

OTHER PUBLICATIONS

*Evolution of The Soft Error Rate Model*, by P. Hardy and D.J. Malone, IEEE Transactions On Magnetics, vol. 27, No. 6, Nov. 1991, pp. 5313–5315.

*Error Rate Performance of Experimental Gigabit Per Square Inch Recording Components*, by T.D. Howell, D.P. McCown, T.A. Diola, Y. Tang, K.R. Hense, and R.L. Gee, IEEE Transactions On Magnetics, vol. 26, No. 5, Sep. 1990, pp. 2298–2302.

*A Track Density Model for Magnetoresistive Heads Considering Erase Bands*, by J.K. Lee and P.I. Bonyhard, IEEE Transactions On Magnetics, vol. 26, No. 5, Sep. 1990, pp. 2475–2477.

*Demonstration Of 500 Megabits Per Square Inch With Digital Magnetic Recording*, by Roy A. Jensen, Joost Mortelmans, and Robin Hauswitzer, IEEE Transactions On Magnetics, vol. 26, No. 5, Sep. 1990, pp. 2169–2171.

*IBM's Next Generation Magnetoresistive Heads*, 1987.

*Magnetoresistive Read Magnetic Recording Head Offtrack Performance Assessment*, by P.I. Bonyhard and J.K. Lee, IEEE Transactions On Magnetics, vol. 26, Nov. 1990, pp. 2448–2450.

*Design Issues For Practical Rigid Disk Magnetoresistive Heads*, by P.I. Bonyhard. IEEE, Transactions On Magnetics, vol. 26, No. 6, Nov. 1990, pp. 3001–3003.

*TMR and Squeeze at Gigabit Areal Densities*, by Patrick C. Arnett and Don McCown, IEEE Transactions On Magnetics, vol. 28, No. 4, Jul. 1992, pp. 1984–1986.

*Window–Shifting Mechanism In Data Separator*, IBM Technical Disclosure Bulletin, vol. 30, No. 6, Nov. 1987.

"Automated Tuning Concepts for Iterative Learning and Repetitive Control Laws" by R. Longman et al., *Proceedings of the 37th IEEE Conference on Decision and Control*, pp. 192–198, (Aug. 1998).

* cited by examiner

REPEATABLE RUNOUT COMPENSATION USING ITERATIVE LEARNING CONTROL IN A DISC STORAGE SYSTEM

CROSS-REFERENCE TO CO-PENDING APPLICATION

This application claims priority benefits from U.S. provisional patent application Ser. No. 60/132,992, filed May 7, 1999, and entitled "COMPUTATIONALLY SIMPLIFIED ZERO ACCELERATION PATH METHODS".

FIELD OF THE INVENTION

The present invention relates generally to disc drive data storage systems. More particularly, the present invention relates to compensation for errors in servo systems.

BACKGROUND OF THE INVENTION

Disc drives read and write information along concentric tracks formed on discs. To locate the read-write head on a particular track on a disc, disc drives typically use embedded servo fields on the disc. These embedded fields are utilized by a servo subsystem to position a head over a particular track. The servo fields are written onto the disc when the disc drive is manufactured and are thereafter simply read by the read-write head of the disc drive to determine position. A multi-rate servo system samples the position of the head relative to a particular track at a particular sampling rate and adjusts the position of the head at a rate that is a multiple of the sampling rate by estimating the position of the head between the measured position samples.

It is desired that the head moves along a perfectly circular path around the disk. However, two types of errors prevent heads from following this ideal path. The first type of error is a written-in error that arises during the creation of the servo fields in servo writing process. Written-in errors occur because the write head used to produce the servo fields does not always follow a perfectly circular path mainly due to unpredictable pressure effects on the write head from the aerodynamics of its flight over the disc, from disk fluttering, from spindle motor vibration, from disk bending, and from vibrations in the gimbal used to support the head. Because of these disturbances, the track written on the disc is not a perfectly circular path and a head in a disc will then follow a non-circular path.

The second type of error that prevents circular paths is known as track following disturbances. Track following errors arise when a head attempts to follow the path defined by the servo fields. The disturbances can be caused by the same aerodynamic and vibrational effects that create written-in errors. In addition, track following errors can arise because the servo system bandwidth is limited and the head is unable to respond fast enough to high frequency changes in the path defined by the servo fields.

Here, we focus on written-in errors. Written-in errors are often referred to as repeatable runout errors because they cause the same errors at the same location each time the head passes along a track. As track densities increase, these repeatable runout errors begin to limit the track pitch. Specifically, variations between the ideal track path and the actual track path created by the servo fields can result in an inner track path that interferes with an outer track path. This is especially acute when a first written-in error causes a head to be outside of an inner track's ideal circular path and a second written-in error causes the head to be inside of an outer track's ideal circular path. This is often referred as track squeeze problem. To avoid limitations on the track pitch, a system is needed to compensate for these repeatable runout errors.

The written-in errors can be compensated by injecting stored compensation values into the servo loop. However, the determination of the compensation values has required complex computations which have often been difficult to implement in disc storage systems. The present invention provides a simple solution to this and other problems and offers other advantages over the prior art.

SUMMARY OF THE INVENTION

The present invention relates to compensation for written-in repeatable-runout in disc drives. The present invention relates to disc drives which have runout compensation which solves the above-mentioned problem.

In accordance with one embodiment of the invention, repeatable-runout compensation is provide in a disc storage system in which servo position values are read from a disc surface which indicates the head position relative to a track on the disc surface. Subsequently, compensation values are retrieved from a table of compensation values and a servo position value is compensated based upon the retrieved compensation value.

In accordance with another embodiment of the invention, a disc drive includes a servo loop for positioning a head over a disc. The disc is adapted to store data on a track and the track includes servo fields adapted to store servo information used to indicate position. The head is adapted to sense the servo information located on the disc and to produce a servo position signal therefrom. The servo position signal is combined with the reference signal to produce a position error signal indicative of a difference between an actual and a desired position of the head relative to the track. A servo controller is adapted to generate a servo control signal in response to the position error signal. An actuator, coupled to the servo control, is adapted to move the head in response to the servo control signal. A compensation table, stored in memory or servo field, is adapted to provide a written in repeatable runout compensation value to the servo control signal.

These and various other features as well as advantages which characterize the present invention will be apparent upon reading of the following detailed description and review of the associated drawings.

DETAILED DESCRIPTION OF ILLUSTRATIVE EMBODIMENTS

Figure 1:
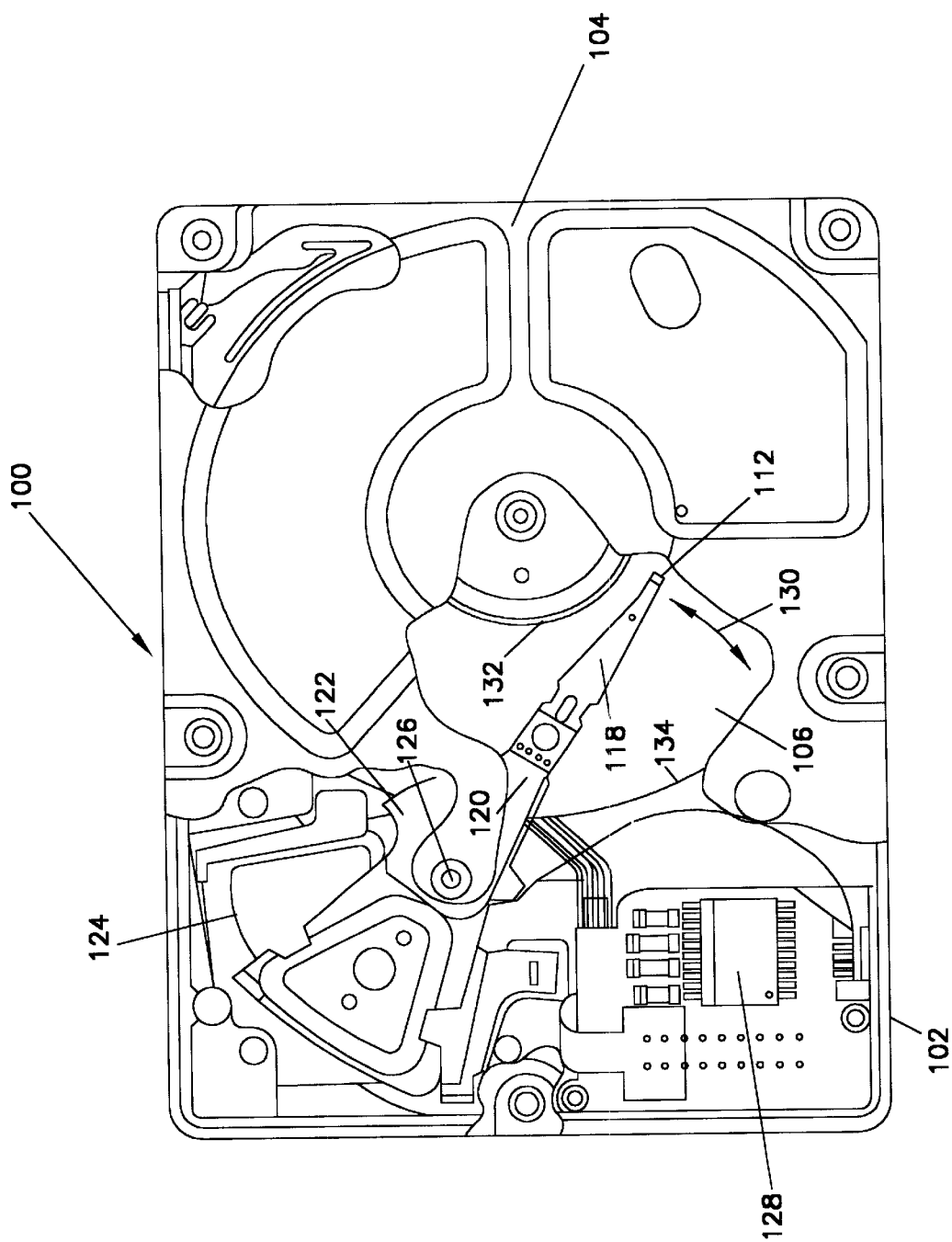
FIG. 1 is a plan view of a disc drive of the present invention.

FIG. 1 is a plan view of a disc drive 100 that includes a housing with a base plate 102 and a top cover 104 (sections of top cover 104 are removed for clarity). Disc drive 100 further includes a disc pack 106, which is mounted on a spindle motor (not shown). Disc pack 106 can include a plurality of individual discs which are mounted for co-rotation about a central axis. Each disc surface has an associated head gimbal assembly (HGA) 112 which is mounted to disc drive 100 for communication with the disc surface. Each HGA 112 includes a gimbal and a slider, which carries one or more read and write heads. Each HGA 112 is supported by a suspension 118 which is in turn attached to a track accessing arm 120 known generally as a fixture, of an actuator assembly 122.

Actuator assembly 122 is rotated about a shaft 126 by a voice coil motor 124, which is controlled by servo control (which is not shown here). HGA 112 travels in an acurate path 130 between a disc inner diameter 132 and a disc outer diameter 134. When the head is properly positioned, write circuitry control (which is not shown here) encodes data for storage on the disc and sends an encoded signal to the head in HGA 112 through internal circuitry 128, which writes the information to the disc. At other times, the read head in HGA 112 reads stored information from the disc and provides a recovered signal to detector circuitry and decoder circuitry control (which is not shown here) to produce a recovered data signal.

Figure 2:
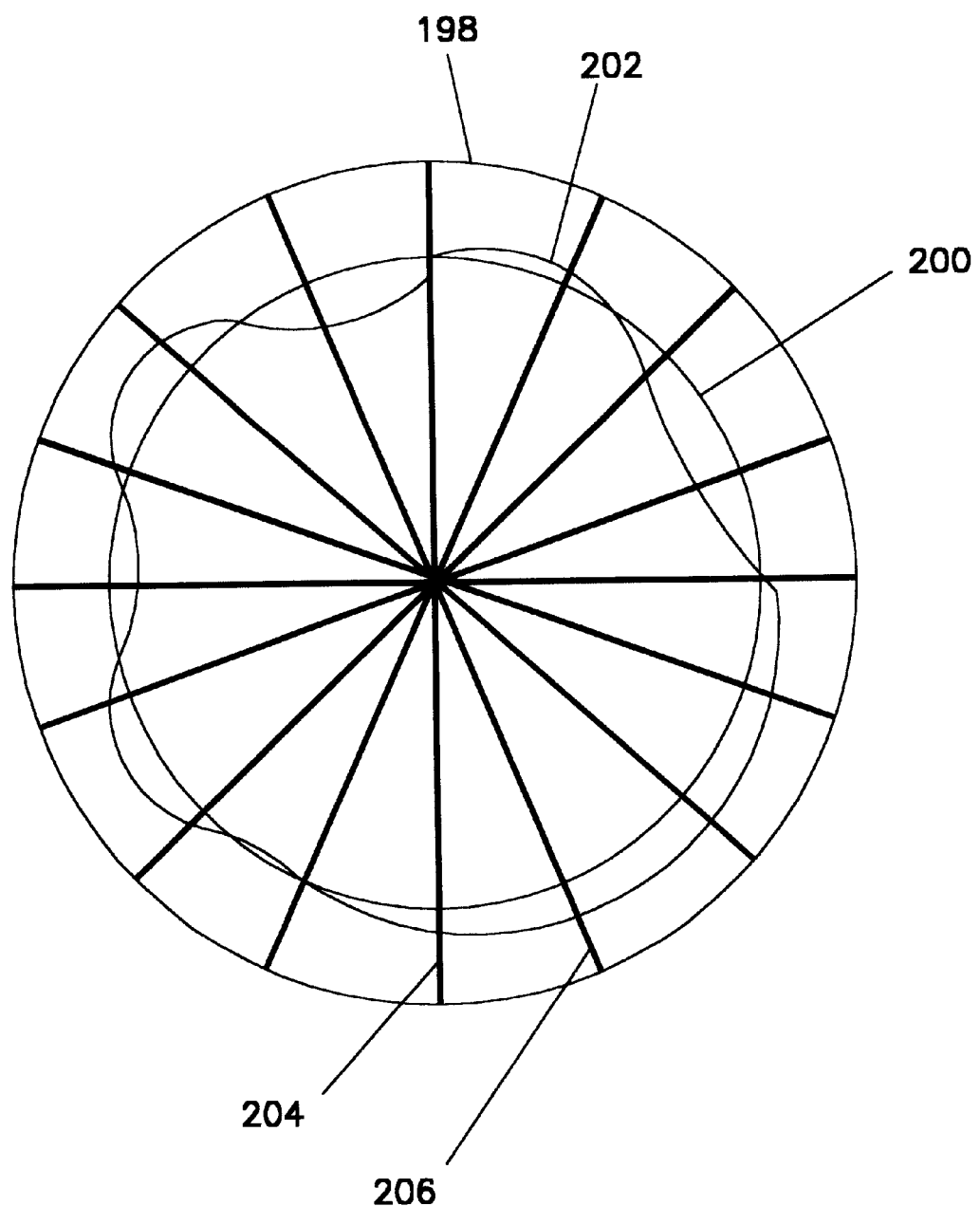
FIG. 2 is a top view of a section of a disc showing an ideal track and a realized written-in track.

FIG. 2 is a top view of a section 198 of a disc showing an ideal, perfectly circular track 200 and an actual written in track 202. Section 198 includes a plurality of radially extending servo fields such as servo fields 204 and 206. The servo fields include servo information that identifies the location of actual track 202 along disc section 198. In a normal drive the head will follow the actual track 202.

Written in error, defined as the difference between actual track 202 and ideal track 200, is introduced in the servo writing process. The written in error is considered as a repeatable runout error since the same error occurs at a particular circumferential location on the disc. Track following of the ideal track 200 is much easier than track following the actual track 202. This is because the reference of the control in the ideal track 200 case is a simple DC signal while in the actual track 202 case, the reference is a DC signal (track 200) plus a complex AC signal (written in error). Following a complex reference will increase the control job for a controller. Further, if the servo bandwidth is limited and the head cannot perfectly follow the complex track 202, then this will result in more head position error signal (PES).

Under the present invention, a head attempting to write to or read from track 202 will not follow track 202 but instead will more closely follow perfectly circular track 200. This is accomplished using a compensation signal that prevents the servo system from tracking repeatable runout errors resulting from the irregular shape of track 202. As a result, the head PES will be reduced.

Figure 3:
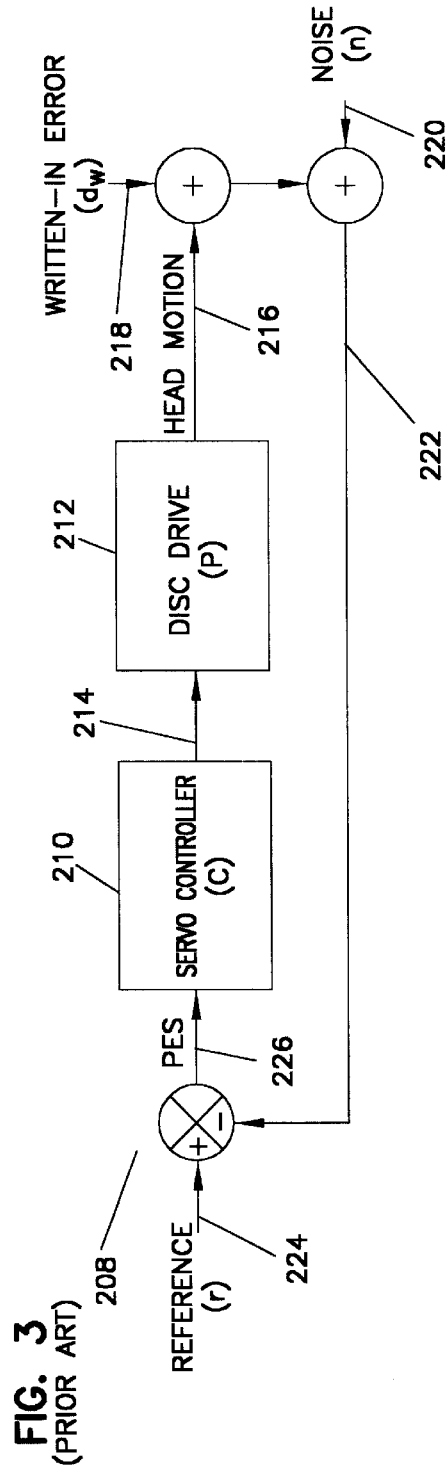
FIG. 3 is a block diagram of a prior art servo loop.

FIG. 3 is a block diagram of a servo loop 208 of the prior art. The servo loop includes a servo controller 210, having a transfer function of "C" and a disc drive 212 having a transfer function of "P". Servo controller 210 is usually implemented using microprocessor and some additional circuits. Disc drive 212 includes actuator assembly 122, voice coil motor 124, track accessing arm 120, suspension 118, and head gimbal assembly 112, all of FIG. 1.

Servo controller 210 generates a control current 214 that drives the voice coil motor of disc drive 212. In response, disc drive 212 produces head motion 216. In FIG. 3, the written-in error, $d_w$, is represented as a separate input signal 218 if the reference r 224 in FIG. 3 is treated as perfectly circular path. The separation of written-in error 218 from head motion 216 provides a better understanding of the present invention. In addition, noise in the servo system has been separated and appears as noise 220, which is added to the head motion. The sum of head motion 216, written-in error 218 and noise 220 results in the head's servo position signal 222. Servo position signal 222 is subtracted from a reference signal 224, which is generated by a microprocessor based on a desired location for the head (reference r 224). Subtracting servo position signal 222 from reference signal 224 produces position error signal (PES) 226 which is input to servo controller 210.

Figure 4:
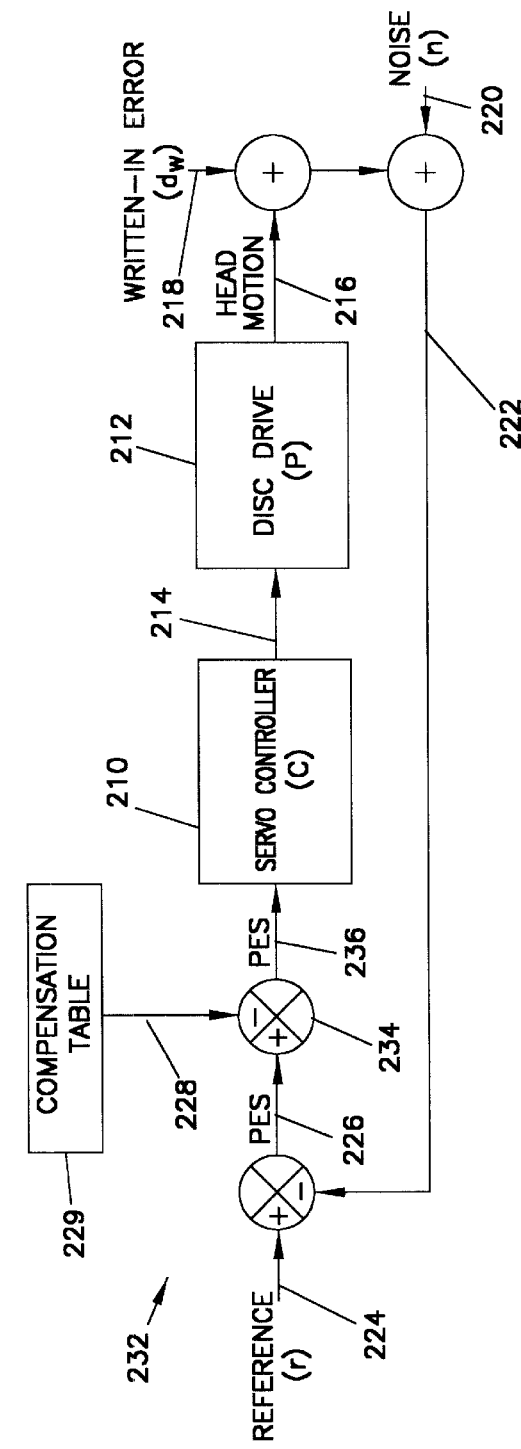
FIG. 4 is a block diagram of a servo loop according to an illustrative embodiment of the present invention.

Heads in servo loops of the prior art will move in response to written-in errors. This movement is undesirable since it places the head outside of the ideally circular track path. This will result in two effects. First, PES will be larger than PES in the loop when there is no written-in errors, which is not desired in disk control. Second, following actual track 202, which is equivalent to written-in errors which are not zero, may cause track squeeze problems. To eliminate the unwanted head motion created by the written-in error, with the present invention feedforward control is used, which inserts a compensation signal to the servo loop. This subtraction is shown in the servo loop 232 of FIG. 4. In FIG. 4, the elements that are common to FIG. 3 are numbered the same. Compensation signal 228 is pre-computed in a process and is stored in memory or harddisk. When the servo loop in FIG. 4 is working, the compensation signal 282 will be read from memory or from harddisk and will be inserted to the loop. At a particular track, the compensation signal 228 comprises a table of written-in repeatable runout values with the size of sector number. Different tracks have different compensation tables. This compensation technique is referred to as repeatable runout (RRO) compensation or zero acceleration path (ZAP) compensation because the head will tend to undergo zero acceleration when following a track.

One aspect of the present invention includes the recognition that the compensation tables take the form of an Iterative Learning Control (ILC) scheme. ILC is a feedforward control added to a normal feedback control loop. It tries to reduce the repetitive part of the control performed by a normal controller. It is very effective when the reference command or the system disturbance is a repetitive one. A common control updating law of ILC output is:

$$U_{k+1}(z)=U_k(z)+K\Phi(z)E_k(z), \tag{1}$$

where $U_k(z)$ is the z-transform of the ILC command at iteration k, K is the learning rate, $\Phi(z)$ is a filter, and $E_k(z)$ is the control error. After updating, $U_{k+1}(z)$ is added to the normal feedback controller output. Let G(z) be the z-transfer function from a plant input U(z) to a plant output Y(z), and set $z=e^{j\omega T}$, the system error $E_k(z)$ will decay every iteration if:

$$\rho(j\omega)=|1-K\Phi(e^{j\omega T})G(e^{j\omega T})|<1 \tag{2}$$

is satisfied at all frequencies. This is an important inequality in ILC. Meeting this condition will ensure reduction of E in (1) at each iteration step. In one ZAP compensation scheme, the compensation (or ZAP) table has a similar updating law:

$$ZAP_{k+1}(j\omega)=ZAP_k(j\omega)+K[1+\hat{P}\hat{C}(j\omega)]RRO_k(j\omega)$$

or $$ZAP(k+1)=ZAP(k)+K\cdot invDFT\{[1+\hat{P}\hat{C}(j\omega)]RRO_k(j\omega)\}, \tag{3}$$

where K is the learning rate, $1+\hat{P}\hat{C}(j\omega)$ is the measured $1+PC(j\omega)$ using a sine injection test and $RRO_k(j\omega)$ is a discrete Fourier transform (DFT) of the repeatable runout $RRO_k$ at iteration k. Note, ZAP(k) and $RRO_k$ are both vectors. Compare (3) and (1), it can be shown that in (3):

$$\Phi=1+\hat{P}\hat{C}, \tag{4}$$

and $$G = \frac{1}{1+PC}. \tag{5}$$

If $\Delta(j\omega)$ is defined as $\Phi(j\omega)G(j\omega)$, then the long term stability condition (2) can be written as:

$$\rho(j\omega)=|1-K\Delta(j\omega)|<1. \tag{6}$$

If $\beta$ at all frequencies meet this condition, then the runout compensation will reduce the repeatable runout components at all frequencies in each iteration.

Thus, the repeatable runout (ZAP) compensation can be categorized as ILC. Ideally, if $\Delta$ is 1, i.e., the estimation of $1+PC(j\omega)$ is accurate, then K in (0, 2) will ensure the decay of RRO after every iteration. In practice, however, $\Delta$ is probably frequency dependant and may be a significant distance away from 1. However, such modeling mismatch ($\Delta$ is not close to 1) is not a problem to iteration stability. If K is chosen properly and condition (2) is met, even if there exists some model mismatch, ZAP compensation can still reduce RRO. This is an important concept in ILC.

If the learning rate is not properly chosen, the standard deviation of RRO may decay quickly for the first few iterations and then rapidly diverge or fluctuate instead of converging. This phenomenon is also observed by researchers in Iterative Learning Control area. The reason is that the stability condition at some frequencies is not satisfied. There are several techniques to overcome this: (1) Try to accurately determine $1+\hat{P}\hat{C}$. However, this may be difficult in some instances. (2) Select a proper learning in each iteration step. The learning rate need not be fixed and its sequence can be optimized to obtain maximum error-reduction at each iteration. (3) Use a zero-phase filter to reduce phase shift in filtering. (4) Cutoff the learning at frequencies where uncertainty is large.

The ZAP compensation is a special case of iterative learning control. In ZAP compensation, the requirement is bit different from ILC. In ZAP compensation, the focus is on: (1) how to get maximum RRO reduction in a minimum iteration steps. (2) Maximum RRO reduction at each iteration step. (3) Long term stability problem is not an issue in RRO compensation, since RRO compensation can be stopped before (i) the standard deviation of RRO becomes unstable, e.g., increases or fluctuates, (ii) or the standard deviation of RRO has been reduced to the required range.

Based on the iterative learning control updating law in (1), the simplest implementation is by letting $E_k(z)$ be $RRO_k(z)$ and $\Phi(z)$ be 1, which yields:

$$ZAP_{k+1}(j\omega)=ZAP_k(j\omega)+K\cdot RRO_k(j\omega)]. \tag{7}$$

However, this will not work when there is an integrator in C (which is usually true), since $\rho$ will be greater than one at low frequencies.

The best choice of $\Phi(z)$ in hard disc servo systems is $\Phi=1+\hat{P}\hat{C}$, where $1+\hat{P}\hat{C}$ or $\hat{P}\hat{C}$ are the estimated $1+PC$ or $PC$ respectively. $1+\hat{P}\hat{C}$ or $\hat{P}\hat{C}$ can be obtained from sine injection tests. The updating law is:

$$ZAP(k+1)=ZAP(k)+K\cdot invDFT\{[1+\hat{P}\hat{C}(j\omega)]RRO_k(j\omega)\}.$$

To obtain ZAP(k+1), a discrete Fourier transform (DFT) needs to be performed on $RRO_k$ to obtain $RRO_k(j\omega)$, and an inverse DFT needs to be performed to compute ZAP(k+1). However, DFT is a time consuming computation, and it requires quite large code space as well as variable space for both real and image part of data. $[1+\hat{P}\hat{C}(j\omega)]RRO_k(j\omega)$ is a complex computation, which requires even more complex computations by a microprocessor. To reduce the computation, in the present invention a new computation method is used. Instead of implementing:

$$ZAP(k+1)=ZAP(k)+K\cdot invDFT\{[1+\hat{P}\hat{C}(j\omega)]RRO_k(j\omega)\},$$

in frequency domain, the equation is implemented in time domain and computation will be greatly reduced. Here, the filter $\Phi(z)$ is obtained by fitting $1+\hat{P}\hat{C}(j\omega)$ to a low order filter, e.g., $2^{nd}$ order filter. Suppose $1+\hat{P}\hat{C}(j\omega)$ has been obtained from a sine injection test or from a Dynamic Signal Analyzer (DSA). To find a low order filter $\Phi(z)$, one can use the 'invfreqs' function in MATLAB (available from the Mathworks, Inc. of Natick, Mass.) to convert the low frequency portion of $1+\hat{P}\hat{C}(j\omega)$ into a $2^{nd}$ order S-transfer-function and then apply the 'c2dm' ('tustin') function in MATLAB to obtain $\Phi(z)$. Or, $\Phi(z)$ can be directly computed based on $1+\hat{P}\hat{C}(j\omega)$ using 'sysfit' in the Mu-toolbox of Matlab. A program can also be written to directly convert a frequency response, such as $1+\hat{P}\hat{C}(j\omega)$, to a z-transfer-function with different weightings at different frequencies. The ZAP table updating law will be:

$$ZAP(k+1)=ZAP(k)+K\cdot\Phi\cdot(z)\cdot RRO(k), \tag{8}$$

where the computation will be just a few additions and multiplication of real numbers. The code and data space requirement is reduced and the computation time is greatly shortened. A learning rate K can be selected such that $\rho$ in (2) is less than 1. A ZAP table of values can be built using (8) using this $\Phi(z)$ and the learning rate. The implementation steps are summarized as follows:

(1) Measure $1+\hat{P}\hat{C}(j\omega),\omega=m\cdot(2\pi f_s),m=1,\ldots,N/2$, at all harmonics of the spindle frequency $f_s$, up to the Nyquist frequency of the servo system, $N/2 f_s$, where N is the sector number.

(2) Fit the low frequency portion of $1+\hat{P}\hat{C}(j\omega)$ to a low order $\Phi(z)$ using 'invfreqs' and 'c2dm' of MATLAB or using other fitting algorithms.

(3) Select a suitable learning rate which meets the condition (2).

(4) Set the iteration, k=0. Initialize CompValue(0)=0. Collect R revolutions of PES data (without injection of written-in repeatable runout (WI-RRO) correction) and calculate RRO(k).

(5) Send RRO(k) through the digital filter $\Phi(z)$ and compute ZAP(k+1) in (8).

(6) Collect R revolutions of PES data while injecting the WI-RRO correction signal ZAP(k+1).

(7) Calculate RRO. If the standard deviation of RRO is larger than the threshold, then k=k+1 and continue iteration at step 4. Else, set the ZAP as the last ZAP (k+1).

The model mismatch between $\Phi(z)$ and $1+P(j\omega)C(j\omega)$ is insignificant as long as the learning rate K is properly chosen. Although $\Phi(z)$ fitting may be complex for a microprocessor, this typically is performed only once for a drive and the computation can be conducted on a typical personal computer (PC). After fitting, the parameters of the filter $\Phi(z)$ can be passed to the microprocessor. In different iterations steps, different K can be selected to achieve a maximum reduction in standard deviation.

To eliminate the initial transient when passing RRO through the digital filter $\Phi(z)$, normal signal processing methods can be applied. One simple technique is by copying RRO over two periods, filtering the 2-period RRO, and retrieving the $2^{nd}$ period output as the filtered output. For different drives, different structures of $\Phi(z)$ can be considered, depending on the loop frequency response. With this present invention, the fitting computation in filter modeling is needed only once per drive while other techniques require Fourier transformations for every track.

In a second example embodiment, instead of fitting $1+\hat{P}\hat{C}$ $(j\omega)$ to a low order filter, $P(j\omega)C(j\omega)$ is fit to a low order filter, e.g., a $2^{nd}$ order filter. $P(j\omega)C(j\omega)$ can be obtained from a sine injection test or from a dynamic signal analyzer. The updating law is defined as:

$$ZAP(k+1)=ZAP(k)+K_1 \cdot RRO(k)+K_2 \cdot F(z) \cdot RRO(k). \quad (9)$$

This is a more general case. To find a filter $F(z)$, the 'invfreqs' function in MATLAB can be used to convert the low frequency portion of $P(j\omega)C(j\omega)$ into a $2^{nd}$ order $F(z)$ following the same procedures in the first example embodiment. A learning rate is selected and checked to determine whether $\rho$ in (2) is less than 1. With $F(z)$, the above steps can be used to fill the compensation table defined in Equation (9). The learning rates $K_1$ and $K_2$ can be different.

In one aspect of the present invention, a method is provided for compensating for written in repeatable runout (RRO) errors in a disc drive 100 having a servo loop 232 for positioning a head 112 relative to a track 202 on a disc surface of rotating disc 198. A servo position value is read from the disc surface which indicates the position of the head 112 relative to the track 202. ZAP compensation values are retrieved from a table of ZAP values and are used to compensate the servo position value. The ZAP values are of the form $ZAP(k+1)=ZAP(k)+K\Phi(z)RRO(k)$, where K is a learning rate; k is the iteration number, $\Phi(z)$ is a filter and $RRO(k)$ is the PES repeatable runout error. Further, inequality $\rho(j\omega)=|1-K\Phi(j\omega)/(1+PC(j\omega)|<1$ should be satisfied, where $PC(j\omega)$ is the open loop frequency response of the servo loop 232. $\Phi(z)$ can comprise a low order filter such as a second order filter which is fit to $1+PC(j\omega)$ or $PC(j\omega)$. The fitting is performed by measuring values of $1+PC(j\omega)$ or $PC(j\omega)$ at harmonics of a spindle frequency of the disc drive 100. They can be determined using a sine wave injection test applied to the servo loop 232. The above inequality can be satisfied by appropriately selecting K. In another aspect, a disc drive 100 is provided having a disc 198 adapted to store data on a track 202. The track includes servo fields adapted to store servo information used to indicate position. A head 112 is provided to sense the servo information located on the disc 198 and to produce a servo position signal 222. The servo position signal is combined with a reference signal 224 to produce a position error signal (PES) 226 indicative of a difference between an actual and a desired position of head 112 relative to track 202. A servo controller 210 is adapted to generate a servo control signal 214 in response to the position error signal 226. An actuator 122 coupled to the servo controller 210 is capable of moving the head 112 in response to the servo control signal 214. A compensation (ZAP) table 229, stored in memory or on a disc, is adapted to provide a written-in repeatable runout compensation value to the servo control signal. The ZAP values are of the form: $ZAP(k+1)=ZAP(k)+k\Phi(k)RRO(k)$, where K is a learning rate; k is the iteration index, $\Phi(z)$ is a filter and $RRO(k)$ is the repeatable runout. Further, $\rho(j\omega)=|1-K\Phi(j\omega)/(1+PC(j\omega)|<1$ should be satisfied, where $PC(j\omega)$ is an open loop frequency response of the servo loop 232. Preferably $\Phi(z)$ comprises a second order filter which can be fit to $1+PC(j\omega)$ or $PC(j\omega)$. The above inequality can be satisfied by appropriately selecting the learning rate K.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, other types of filters or fitting techniques can be used to determine the compensation values without departing from the scope and spirit of the present invention. The invention can be implemented in hardware, software or their combination. The particular blocks referenced herein and shown in the figures are for illustration only, and any configuration can be employed.

What is claimed is:

1. A method for compensating for repeatable runout (RRO) errors in a disc drive having a servo loop for positioning a head relative to a track on a disc surface of a rotating disc, comprising:
   (a) retrieving a servo position value from the disc surface indication of head position relative to the track;
   (b) retrieving a compensation (ZAP) value from a table of ZAP values; and
   (c) compensating the servo position value with the ZAP value;
   (d) wherein the ZAP values are of the form:

$$ZAP(k+1)=ZAP(k)+K\Phi(z)RRO(k),$$

where K is a learning rate; k is iteration number $\Phi(z)$ is a filter and $RRO(k)$ is the repeatable runout error, and the following inequality is satisfied $$\rho(j\omega)=|1-K\Phi(j\omega)/(1+PC(j\omega)|<1,$$

where $PC(j\omega)$ is an open loop frequency response of the servo loop.

2. The method of claim 1 wherein the filter $\Phi(z)$ comprises a low order filter.

3. The method of claim 2 including determining the low order filter by fitting $(1+PC(j\omega))$ to the low order filter.

4. The method of claim 3 wherein the step of fitting includes measuring $(1+PC(j\omega))$ at harmonics of a spindle frequency of the disc drive.

5. The method of claim 1 including selecting K such that $\rho(j\omega)=|1-K\Phi(j\omega)/(1+PC(j\omega)|<1$.

6. The method of claim 3 including generating the ZAP values as a function of the second order filter.

7. The method of claim 2 including determining the second order filter by fitting the open loop frequency response $PC(j\omega)$ to the low order filter.

8. The method of claim 7 wherein the step of fitting includes measuring the open loop frequency response $PC(j\omega)$ at harmonics of a spindle frequency of the disc drive.

9. The method of claim 3 wherein $(1+PC(j\omega))$ is determined with a sine wave injection test.

10. The method of claim 7 wherein the open loop frequency response $PC(j\omega)$ is determined with a sine wave injection test.

11. The method of claim 7 including generating the ZAP values as a function of the low order filter.

12. A disc drive for storing information, comprising:
    a disc adapted to store data on a track, the track including servo fields adapted to store servo information used to indicate position;

a head adapted to sense the servo information located on the disc and to produce a servo position signal therefrom, the servo position signal being combined with a reference signal to produce a position error signal indicative of a difference between an actual and a desired position of the head relative to the track;

a servo controller adapted to generate a servo control signal in response to a received position error signal;

an actuator, coupled to the servo controller, which is capable of moving the head in response to the servo control signal;

a compensation (ZAP) table adapted to provide a written-in repeatable run-out ZAP values to the servo control signal of the form:

$$ZAP(k+1)=ZAP(k)+K\Phi(z)RRO(k),$$

where K is a learning rate; k is iteration number, $\Phi(z)$ is a filter and RRO(k) is the repeatable runout error, and the following inequality is satisfied $$\rho(j\omega)=|1-K\Phi(j\omega)/(1+PC(j\omega)|<1,$$

where $PC(j\omega)$ is an open loop frequency response of the servo loop.

13. The apparatus of claim 12 wherein the filter $\Phi(z)$ comprises a low order filter.

14. The apparatus of claim 13 wherein the low order filter is fit to $(1+PC(j\omega))$.

15. The apparatus of claim 12 wherein K is selected such that $\rho(j\omega)=|1-K\Phi(j\omega)/(1+PC(j\omega)|<1$.

16. The apparatus of claim 13 wherein the low order filter is fit to the open loop frequency response $PC(j\omega)$.

17. The apparatus of claim 13 wherein the ZAP values are a function of the low order filter.

18. A method for compensating for repeatable runout (RRO) errors in a disc drive having a servo control loop to control a head relative to a track on a disc surface of a rotating disc, comprising:
   (a) retrieving a servo position value from the disc surface indication of head position relative to the track;
   (b) retrieving a compensation value from a compensation table of compensation values; and
   (c) compensating the servo position value with the compensation value in the servo control loop; and
   (d) wherein the compensation table comprises an Iterative Learning Control (ILC) scheme to add feed forward control to the servo control loop to reduce a repetitive portion of the control.

* * * * *